United States Patent [19]

Tegel

[11] Patent Number: 4,776,493

[45] Date of Patent: Oct. 11, 1988

[54] DISCHARGE CONTROL VALVE

[75] Inventor: Robert Tegel, Palatine, Ill.

[73] Assignee: General Kinematics Corporation, Barrington, Ill.

[21] Appl. No.: 34,754

[22] Filed: Apr. 6, 1987

[51] Int. Cl.⁴ .............................................. B65D 47/00
[52] U.S. Cl. .................................... 222/196; 222/502; 222/547; 222/559
[58] Field of Search .............. 222/161, 196, 282, 437, 222/457, 476, 481, 482, 502, 503, 509, 545, 547, 559, 564, 565; 164/200–202; 251/318, 326; 137/453, 454, 261; 414/288, 414

[56] References Cited

U.S. PATENT DOCUMENTS

| | | | |
|---|---|---|---|
| 442,766 | 12/1890 | Brennan, Jr. | 222/502 |
| 2,486,200 | 10/1949 | O'Connor | 222/564 |
| 2,631,567 | 3/1953 | Gilson | 222/457 X |
| 3,107,702 | 10/1963 | Gex et al. | 141/129 X |
| 3,135,427 | 6/1964 | Siegburg | 222/502 X |
| 3,718,164 | 2/1973 | Stewart | 141/129 X |
| 4,131,193 | 12/1978 | Musschoot | 198/533 |
| 4,398,578 | 8/1983 | Walters et al. | 222/129.4 X |
| 4,546,872 | 10/1985 | Musschoot | 198/533 |
| 4,685,504 | 8/1987 | Bond et al. | 164/5 X |

FOREIGN PATENT DOCUMENTS 1949730  4/1971  Fed. Rep. of Germany ...... 222/502

Primary Examiner—Kevin P. Shaver
Attorney, Agent, or Firm—Wood, Dalton, Phillips, Mason and Rowe

[57] ABSTRACT

A general purpose valve is provided to control the discharge of particulate material. An overlying plate with a first, through aperture, cooperates with an underlying plate having a solid surface and a second through aperture. The first aperture is in vertical alignment with the solid surface on the underlying plate. Structure is provided to vary the vertical spacing between the overlying and underlying plates to selectively commence, terminate, and vary the rate of flow of particulate material.

20 Claims, 1 Drawing Sheet

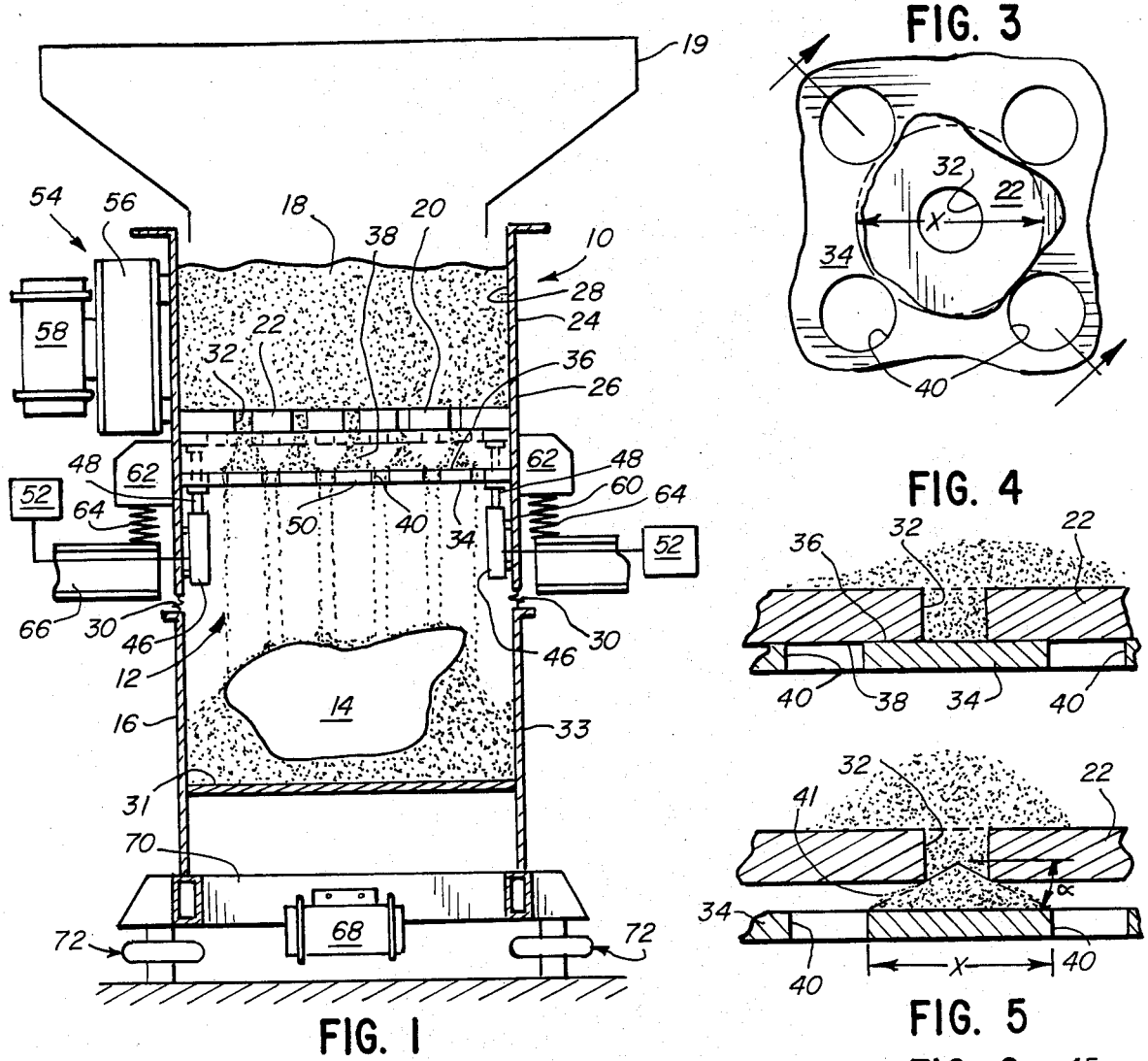
FIG. 3
FIG. 4
FIG. 1
FIG. 5
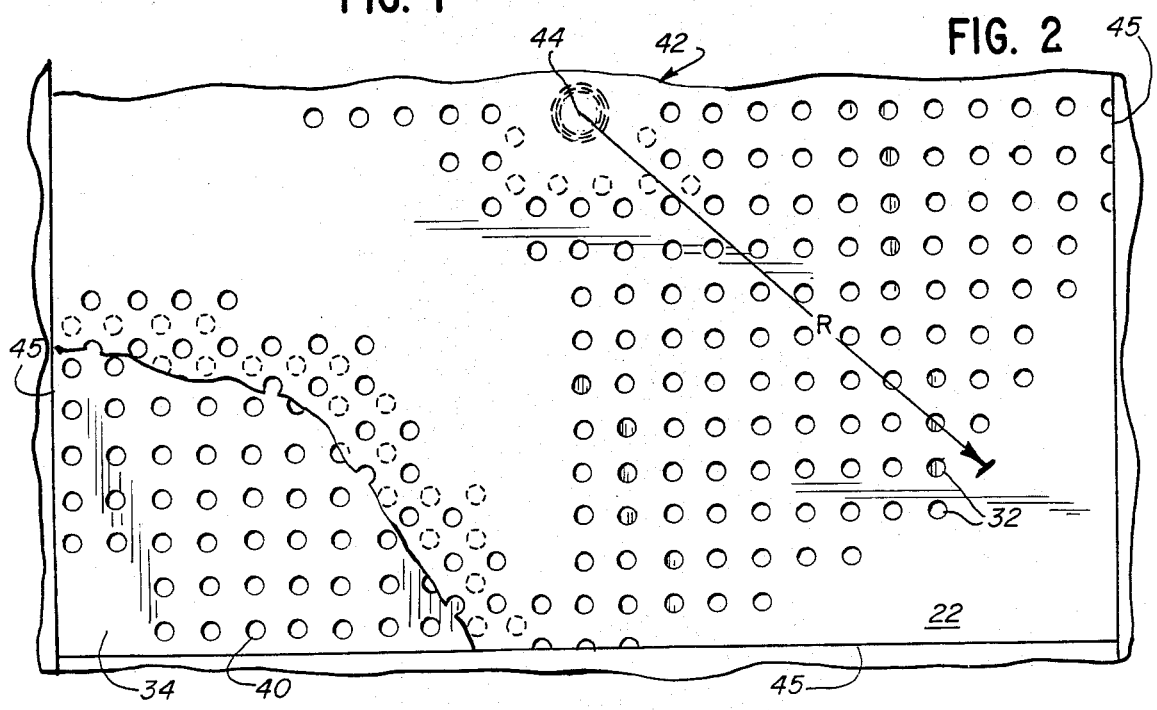
FIG. 2

DISCHARGE CONTROL VALVE

BACKGROUND OF THE INVENTION

1. Field of the Invention

This invention relates to valves for controlling the discharge of a particulate material from a supply.

2. Background Art

Controlled discharge of particulate material is required in many, diverse industries. Typically, a supply of the material is carried in a hopper having a bottom, load bearing surface with one or more apertures through which the material is delivered to a point of use.

One known structure to variably control the rate of discharge of material from a supply employs three cooperating plates with selectively registrable apertures. Such a structure is shown in British Patent Specification 967,096, issued to Fordath Engineering. A control shifts one plate between the others to effect a desired degree of registration to thereby control the effective area of the discharge opening and the discharge rate.

Several problems are inherent in such a design. First, the three plates have cooperating, flat surfaces, which must be machined to very close tolerances to maintain slidable face-to-face contact. Material may find its way inbetween the plates and thereby cause wear on the elements so as to prevent close engagement between facing plate surfaces. Also, in a high temperature environment, the plates may deform, so that the cooperating, flat surfaces cannot intimately engage and may bind with each other. In either event, the operation of the valve is adversely affected.

Further, a fairly complicated structure is required to accurately guide relative movement of the plates against each other to control the feed rate.

Another problem with prior art sliding plate valves is that it is possible for material to become wedged between the edges of the apertures of the juxtaposed plates so that the moving plate is jammed. A rigid wedged piece may have to be manually moved before resuming normal operation of the valve.

A still further problem with prior art sliding plate valves is that generally poor transition from the no-flow condition occurs once the plate apertures are registered. At startup, flow generally will not begin or will continue for only a short time, even though the plate apertures are in registration, until the valve structure is vibrated to eliminate bridging of the material and to loosen the material supply.

SUMMARY OF THE INVENTION

The present invention is specifically directed to overcoming the above enumerated problems in a novel and simple manner.

According to the invention, a general purpose valve is provided to control the discharge of particulate material. An overlying plate with a first, through aperture, cooperates with an underlying plate having a solid surface and a second through aperture. The first aperture is in vertical alignment with the solid surface on the underlying plate. Structure is provided to vary the vertical spacing between the overlying and underlying plates.

The present invention comprehends varying the rate of flow of particulate material through the first and second apertures by simply varying the relative vertical positions of the plates. The inventive structure relies in operation on the consistent configuration that a pile of particulate material will take as generally characterized by the angle of repose or slump angle for that material.

Briefly, when particulate material is piled, a slope will result that is constant for a given type of material and independent of the amount of material. For example, two identical quantities of a different type of particulate material may pile at different heights. The higher pile has a larger angle of repose. Increasing the amount of material in the pile does not change the angle of repose, but rather increases the height of the pile and area of distribution of the material on the supporting surface therefor.

According to the invention, a change in the vertical relationship of the overlying and underlying plates controls the areas of distribution of particulate material on the underlying plate surface. In a no-flow condition, the first aperture is not aligned vertically with any portion of the second aperture and the underlying and overlying plates are either closely against each other so that the first aperture is blocked or are spaced so that the area of distribution of material on the underlying plate does not intersect with any of the apertures in the underlying plate. As the plates are moved away from each other, the area of distribution of material increases progressively as the material is delivered onto the underlying plate. Once the plates are sufficiently far apart, the diameter of the distribution area of the particulate material will intersect the second aperture and the material will flow therethrough.

With the plate apertures strategically arranged, the plates do not have to be moved closely against each other to shut off flow. Rather the relative positions of the plates can be controlled so that the edge of the distribution area is immediately adjacent to the apertures in the underlying plate. Immediately upon the plates being moved further apart flow from the aperture in the overlying plate spills over into the aperture in the underlying plate. There are no gaps created in the material between the supply and underlying plate as are created in the sliding plate valves of the prior art when flow is cut off and which account for bridging and hang-up.

In a preferred form, the overlying plate has a circular aperture and the underlying plate has at least two circular apertures arranged so that the distances between the center of the first aperture and the centers of the second apertures are the same. As a result, as the distribution area on the underlying plate increases, the material moves progressively into an increasingly larger diameter of the second apertures. This accounts for smooth transition in flow rate.

The invention also comprehends structure for vibrating the cooperating valve plates. This prevents hang-up and bridging of the material so that smooth flow and flow transition result and reduces the effective angle of repose for a given material. When changing from a static state with the plates vertically spaced and the edge of the distribution area on the underlying plate adjacent to one of the apertures in the underlying plate, vibration will instantaneously enlarge the distribution area and initiate flow.

With the inventive structure, the flow rate can be precisely controlled, transition in flow rate will be smooth, and the need to have cooperating surfaces moving closely against each other in shear, as in commonly used prior art structures, is obviated.

BRIEF DESCRIPTION OF THE DRAWINGS

FIG. 1 is a sectional view of a vibratory sand and casting handling apparatus with the inventive discharge control valve incorporated for controllable discharge of particulate material;

FIG. 2 is an enlarged, fragmentary, plan view of cooperating plates on the discharge control valve;

FIG. 3 is an enlarged, fragmentary, plan view of the discharge control valve showing the relationship of apertures on cooperating valve plates;

FIG. 4 is a sectional view of the valve along line 4—4 of FIG. 3 with the valve in a no-flow state; and FIG. 5 is a view similar to that in FIG. 4 with the valve in an open state.

BEST MODE FOR CARRYING OUT THE INVENTION

A sand and casting handling system is shown at 10 in FIG. 1 having the inventive discharge control valve at 12 incorporated. It should be understood that this particular application of the control valve is not intended to be limiting, as the valve according to the invention has application in numerous other apparatus and industries. This particular system was chosen to demonstrate the structure and advantages of the inventive control valve.

Briefly, the system 10 may be utilized in a metal casting process in which foundry sand is compacted about a pattern 14 in a flask 16. Typically, a STYROFOAM pattern 14 is positioned in the flask. Sand is caused to be rained onto the pattern 14 simultaneously as the flask is vibrated. Vibration of the apparatus prevents bridging and hanging up of the sand and assure that the sand finds its way into all crevices as it is compacted about the form. Once molten metal is delivered into the form, the STYROFOAM vaporizes and is exhausted by suitable structure.

Controlled delivery of the sand from a supply 18 is desired primarily for two reasons. First, controlled delivery of the sand eliminates hanging up and bridging of the sand around the pattern 14 and permits a progressive, uniform compaction of the sand around the pattern 14. Secondly, the STYROFOAM mold may have intricate protrusions which are prone to breakage under a large load of the sand. Thus, it is desirable to have the ability to select the flow rate of sand and in some cases to vary the rate in selected areas. Both these ends can be realized with the inventive structure.

The supply 18 of sand is introduced to the system 10 through a hopper 19 and its weight is borne principally by a flat, upwardly facing surface 20 on an overlying plate 22 on the control valve 12. The supply 18 is confined cooperatively by the plate 20 and upper housing 24.

The plate 22 is illustrated as square and closely matched to the cross section of the housing 24 and fixed thereto so that material cannot pass between the peripheral edge 26 of the plate 22 and the inside surface 28 of the housing 24. Sand flows downwardly from the supply 18 into a plurality of through apertures 32 in plate 22.

The flask 16 includes a housing 33 having a floor 31 and, a cross section generally matched to housing 24. The pattern 14 is supported in the flask. A resilient diaphragm 30 is interposed between the bottom of the housing 24 and top of the flask 16 or lower housing 33 to maintain a dust seal and permit relative movement therebetween without transmitting vibratory motion from one to the other.

Beneath the plate 22 is an underlying plate 34 having a flat, upper surface 36 which is parallel to and faces a downwardly facing flat surface 38 on the plate 22. The underlying plate 34 has through apertures 40 for passage of sand delivered through the apertures 32 in the overlying plate 22.

FIG. 2 depicts a preferred arrangement of apertures in both the overlying plate 22 and underlying plate 34. The apertures are preferably regularly arranged in a grid pattern, although this configuration may be modified if heavier or lighter sand deposition is required in some areas of the flask. The pattern is interrupted at the center area 42 of the plate 22 and outwardly beyond a radius R, which radius is equal to the distance between the center 44 and each of the four sides 45 (three shown) of the square plate 22. In one operative embodiment, the apertures are on $1\frac{1}{2}$ inch centers.

The apertures 40 in the underlying plate 34 are also arranged in a grid pattern, which is interrupted only at the center portion of the plate. The center-to-center spacing of the apertures 40 is preferably equal to that of the apertures 32 on the overlying plate 22. The apertures 32 and 40 are entirely misaligned with each other in a vertical direction. As can be seen in FIGS. 2 and 3, each aperture 32 on the overlying plate 22, with the exception of those in the center area 42 and outside of a radius R from the center 44, is centered amongst four apertures 40 on the underlying plate 34.

With the valve 12 in the no-flow condition in FIG. 4, the facing surfaces 36, 38 on the underlying plate 34 and overlying plate 22, respectively, are in intimate facial engagement. Each aperture 32 is thus completely blocked by a solid portion of the upwardly facing surface 36 on the plate 34. In this condition, no flow through the valve can occur.

In the no-flow condition of FIG. 4, the area of distribution of the particulate material on the underlying plate is equal to the area of the aperture 32. As the plate surfaces 36, 38 are moved away from each other, as shown in FIG. 5, the area of distribution of the particulate material or sand on the lower plate 34 remains generally circular but enlarges. At a predetermined spacing of the plates 22, 34, the diameter of the distribution area will be equal to the spacing between diametrically opposite apertures 40 on the underlying plate 34, shown as distance X in FIGS. 3 and 5, for a material having an angle of repose $\alpha$ as shown in FIG. 5. This is the flow transition position of the plate.

As the plates are moved further apart from the FIG. 5 position, the pile becomes larger and the area of distribution of particulate material on the lower plate 34 enlarges so that the material spills over simultaneously into the four adjacent apertures and rains down into the flask 16 as shown in FIG. 1 and at 40 in FIG. 5. The change in flow rate, once flow begins, is gradually accomplished. The sand spills into a progressively larger area of each aperture 42.

While the apertures 32 in plate 22 have been described as being situated entirely over a solid portion of plate 34 in a no-flow state, it is possible that a valve according to the invention may not have a fully closed state yet it may still be functional to vary the rate of discharge by controlling the relative vertical positions of the plates 22, 34.

In a preferred form, the overlying plate 22 is fixed to the housing 24. The underlying plate 34 is selectively, vertically movable. Because the plate 34 has a cross section substantially matched to the square housing cross section, other than relative vertical movement between the plates 22, 34 is prohibited.

To control movement of the plate 34, a pair of hydraulically operated cylinders 46 is provided. Each cylinder 46 has an extendible ram 48, which engages the underside 50 of the plate 34. Controls 52 determine the position of the rams 48. Extension of the rams from the solid line position of FIG. 1 moves the plate 22 against the plate 34 to the no-flow position shown in dashed lines in FIG. 1. Retraction of the rams 48 from the solid line position of FIG. 1 increases flow rate.

The invention also contemplates the provision of a vibration imparting structure at 54, though this structure is optional. Vibration causes the angle of repose to be diminished, which means that for a given amount of material, the distribution area on the supporting surface is greater than it would be under static conditions. Thus, vibration will have the effect of increasing the flow rate for a given position of the plate 34 relative to the plate 22 and a given material. At the same time, vibration prevents hang-up of material in the delivery portion of the system 10.

To vibrate this system, a mount 56 is carried on the housing 24 and has an associated vibration imparting motor 58, having a shaft with eccentric weights or other conventional structure for imparting vibration through the mount 56 to the housing 24. The mid-portion 60 of the housing has outwardly projecting support blocks 62. Springs 64 are interposed between the blocks 62 and support beams 66 therebeneath.

In one operative structure, the underlying plate 34 is lowered to a position where the area of distribution of material does not reach to the apertures 40 in the underlying plate 34 so that no material will flow. When flow is desired, the vibration imparting structure 54 is actuated whereby the angle of repose of the material is changed and the area of distribution is enlarged to overlap the apertures 40 whereby flow will commence. Shutting off the vibration structure 54 will once again shut off the flow. The flow rate can be increased or decreased by changing the intensity of vibrations of the vibratory structure 54 or by increasing or decreasing the spacing between the plates 22 and 34.

The flask 16 is vibrated independently of the housing 24 through a vibration imparting motor 68, similar to motor 58 associated with the upper housing 24. The motor 68 is carried on a frame 70, at the bottom of the housing 33. The frame 70 is carried by resilient mounts 72, of conventional construction, bearing on a support surface 74.

It can be seen that with the inventive structure, rate of flow of particulate material can be simply controlled by the movement of a single plate and by taking advantage of the constant angle of repose for materials. There is no requirement that any parts be slid against each other as is required in one type of conventional valve. At the same time rapid transition from a no-flow condition occurs and smooth transition of flow rate results from the strategic situation of apertures in the underlying and overlying plates.

I claim:

1. A valve for controlling the discharge of particulate material, said valve comprising:
   an overlying plate having at least one first aperture therethrough into which particulate material can be introduced;
   an underlying plate having a horizontal, flat, solid surface and at least one second aperture through the underlying plate,
   said first aperture being in vertical alignment with the solid surface on the underlying plate; and
   means for varying the vertical spacing between the overlying and underlying plates without relative horizontal movement of said plates,
   whereby increasing the vertical spacing between the plates increases the area of distribution of particulate material on the flat surface of the underlying plate to thereby initiate or increase the rate of flow of particulate material through the second aperture and decreasing the vertical spacing of the plates decreases the area of distribution of particulate material on the flat surface of the underlying plate to decrease the rate of or cut off flow of material through the second aperture.

2. The discharge control valve of claim 1 wherein the at least one first aperture in the overlying plate comprises a plurality of apertures vertically aligned over solid surfaces of the underlying plate.

3. The discharge control valve of claim 1 wherein said overlying plate has a flat, downwardly facing surface, the solid surface of the underlying plate faces said downwardly facing surface, and the first aperture has a perimeter enclosed by the surface of the overlying plate and the second aperture has a perimeter enclosed by the surface of the underlying plate.

4. The discharge control valve of claim 1 wherein said first aperture is circular in cross section, said at least one second aperture in said underlying plate comprises a plurality of apertures and each of said plurality of apertures is circular in cross section.

5. The discharge control valve of claim 1 wherein said first aperture is circular in cross section, said at least one second aperture in said underlying plate comprises a plurality of apertures that are each circular in cross section wherein each of said plurality of apertures has an equal diameter and the spacing between the center of the first aperture and the centers of each of said plurality of apertures is approximately the same.

6. The discharge control valve of claim 1 wherein said at least one second aperture in said underlying plate comprises a plurality of apertures and the shortest distances between the first aperture and each of the closest of said plurality of apertures are approximately the same.

7. The discharge control valve of claim 1 further including means for imparting vibration to said valve to thereby increase the area of distribution of particulate material on the underlying plate surface.

8. The discharge control valve of claim 1 wherein said overlying plate has a flat, downwardly facing surface, the solid surface of the underlying plate faces said downwardly facing surface and the varying means comprises means for moving at least one of the plates towards and away from the other of the plates and for situating the downwardly facing surface of the overlying plate against the solid surface of the underlying plate to block flow of particulate material through said first aperture.

9. The discharge control valve of claim 8 wherein the first aperture has a perimeter enclosed by the surface of said overlying plate and the second aperture has a perimeter enclosed by the surface of the second plate.

10. The discharge control valve of claim 9 including means for imparting vibration to said valve to thereby increase the area of distribution of particulate material on the underlying plate surface.

11. An apparatus for controllably discharging a supply of particulate material, said apparatus comprising:
a hopper for confining a supply of particulate material;
an overlying plate having a flat, horizontal upwardly facing surface for supporting the particulate material in the hopper and at least one first through aperture;

an underlying plate beneath said overlying plate and having a solid, flat, horizontal, upwardly facing surface and at least one second through aperture, said first aperture having a perimeter enclosed by the surface of the overlying plate and the second aperture having a perimeter enclosed by the surface of the underlying plate, said first aperture being in vertical alignment with the solid surface on the underlying plate; and means for varying the vertical spacing between the overlying and underlying plates without relative horizontal movement of said plates, whereby increasing the vertical spacing between the plates increases the area of distribution of particulate material on the underlying plate surface to thereby initiate or increase the rate of flow of particulate material through the second aperture and decreasing the vertical spacing of the plates decreases the area of distribution of particulate material on the underlying plate surface to decrease the rate of or cut off flow of material through the second aperture.

12. The apparatus for controllably discharging a supply of particulate material according to claim 11 further including means for imparting vibration to said plates to thereby increase the area of distribution of particulate material on the underlying plate surface.

13. The discharge control valve of claim 11 wherein said overlying plate has a flat, downwardly facing surface and the solid surface of the underlying plate faces said downwardly facing surface.

14. The discharge control valve of claim 11 wherein said overlying plate has a flat, downwardly facing surface and the solid surface of the underlying plate faces said downwardly facing surface and the varying means comprises means for moving at least one of the plates selectively towards and away from the other of the plates and to situate the downwardly facing surface of the overlying plate against the solid surface of the underlying plate to block flow of particulate material through said first aperture.

15. The discharge control valve of claim 11 wherein said first aperture is circular in cross section, said at least one second aperture in said underlying plate comprises a plurality of apertures and each of said plurality of apertures is circular in cross section.

16. The discharge control valve of claim 11 wherein said first aperture is circular in cross section, said at least one second aperture in said underlying plate comprises a plurality of apertures and each of said plurality of apertures is circular in cross section wherein each of said plurality of apertures has an equal diameter and the horizontal spacing between the center of the first aperture and the centers of each of the closest of said plurality of apertures is approximately the same.

17. The discharge control valve of claim 11 wherein said at least one second aperture in said underlying plate comprises a plurality of apertures and the shortest distances between the first aperture and each of the closest of said plurality of apertures is approximately the same.

18. An apparatus for controllably discharging a supply of particulate material, said apparatus comprising:

a hopper for confining a supply of particulate material;

an overlying plate having a flat, horizontal, upwardly facing surface for supporting the particulate material in the hopper, a flat downwardly facing surface parallel to the upwardly facing surface and at least one first through aperture;

an underlying plate beneath said overlying plate and having a flat, solid, horizontal, upwardly facing surface and at least one second through aperture, said first aperture having a perimeter enclosed by the surface of the overlying plate and the second aperture having a perimeter enclosed by the surface of the underlying plate, said first aperture being in vertical alignment with the solid surface on the underlying plate; and means for varying the relative vertical positions of said overlying and underlying plates without relative horizontal movement of said plates between (a) a closed position wherein the underlying plate blocks the passage of material through the first aperture to below said overlying plate and (b) an open position wherein at least one of the plates is moved vertically away from the other from the closed position sufficiently that a flow path for material is defined for communication of material through said first aperture and into said second aperture, whereby increasing the vertical spacing between the plates increases the area of distribution of particulate material on the underlying plate surface to thereby initiate or increase the rate of flow of particulate material through the second aperture and decreasing the vertical spacing of the plates decreases the area of distribution of particulate material on the underlying plate surface to decrease the rate of or cut off flow of material through the second aperture.

19. The discharge control valve of claim 18 further including means to impart vibration to at least the underlying plate to increase the distribution area of the material on the underlying plate.

20. The discharge control valve of claim 19 wherein said at least one first aperture in the overlying plate comprises a plurality of apertures and said at least one second aperture in said underlying plate comprises a plurality of apertures, said plurality of apertures in said underlying plate being spaced from said plurality of apertures in said overlying plate in more than one direction thereby resulting in a uniform flow rate throughout the overlying and underlying plates.

* * * * *